United States Patent [19]

Hoberman et al.

[11] Patent Number: 5,015,994
[45] Date of Patent: May 14, 1991

[54] SECURITY LIGHT CONTROLLED BY MOTION DETECTOR

[75] Inventors: Kenneth Hoberman; Kim Kirwan, both of Omaha, Nebr.; Gary Gordon, Shenandoah, Iowa

[73] Assignee: GRH Electronics, Omaha, Nebr.

[21] Appl. No.: 458,131

[22] Filed: Dec. 28, 1989

[51] Int. Cl.⁵ ............................................. G08B 13/18
[52] U.S. Cl. .................................. 340/567; 250/221; 250/342; 340/586
[58] Field of Search ............... 340/567, 573, 691, 693, 340/586, 522; 250/342, 349, 353, 221

[56] References Cited

U.S. PATENT DOCUMENTS

| | | | |
|---|---|---|---|
| 4,695,829 | 9/1987 | Everett et al. | 340/586 |
| 4,703,171 | 10/1987 | Kahl et al. | 250/221 |
| 4,823,051 | 4/1989 | Young | 340/567 X |
| 4,843,283 | 6/1989 | Chen | 340/567 X |
| 4,873,469 | 10/1989 | Young et al. | 340/567 X |
| 4,876,445 | 10/1989 | McMaster | 250/221 |

OTHER PUBLICATIONS

"Infrared Motion Detectors for Security Lighting—User Guide", by Tahoe Products, Inc., Sparks, Nev.
"RCA Security Switch Motion Sensing Light Control—Owner's Guide", RCA/New Products Division, Lancaster, Pa., 1985.

*Primary Examiner*—Glen R. Swann, III
*Assistant Examiner*—Thomas J. Mullen, Jr.
*Attorney, Agent, or Firm*—Steven F. Caserza

[57] ABSTRACT

A novel illumination device is provided which is small, inexpensive, and conveniently plugs into a standard power outlet, thereby allowing easy installation and deinstallation by nontechnical consumers, and thereby allowing the security light to be easily moved to any wall outlet as security needs change. This illumination device includes a motion detector so that the illumination is provided only in the presence of one or more persons who would find the illumination beneficial. A photoelectric device is provided such that the security light is illuminated in response to motion only when there is an insufficient amount of ambient light available from other sources. In one embodiment, a vision restrictor is provided such that motion is detected only from a desired detection area. In one embodiment, a vision extender is utilized in order to optimize the field of view for the motion detector, making the device more useful in narrow hallways and other unique installations.

11 Claims, 6 Drawing Sheets

SECURITY LIGHT CONTROLLED BY MOTION DETECTOR

BACKGROUND

This invention pertains to lighting devices and more particularly to lighting devices such as security lights or night lights which provide a desired amount of illumination in the absence of illumination from other sources.

Security lighting and night lights are well known in the prior art. A typical night light of the prior art includes a simple neon bulb connected in series through a resistor to an AC outlet providing a constant glow which serves to provide a minimal amount of lighting at night. A more sophisticated prior art device includes a photoelectric detector so that the night light provides illumination only in the absence of sufficient illumination from other sources. Other prior art night lights provide greater illumination by utilizing a lamp other than a small neon bulb.

Security lighting is also known in the prior art. One form of security lighting are lights which are activated in response to motion such that an area is illuminated only when a person is in that area. At other times, no motion is detected and the security light turns off. Such prior art motion detector security lights are bulky, high wattage, and provide a great amount of illumination to a wide area, such as to a walkway or drivewaY. Thus, these prior art security lights are bulky, and must be securely and permanently attached to a light fixture or a building, and are wired into the AC power mains in a very permanent fashion. Such prior art security lights often include adjustments to set the sensitivity of the motion detector and the delay time dictating how long the light will remain illuminated following the cessation of motion. It is also known to include a photoelectric device in such security lights in order to deactivate the security light when there is sufficient ambient light from other sources.

There remains the need for a small lighting device which is capable of providing a desired amount of illumination in response to the presence of one or more persons in the area desired to be illuminated which is often maintained in darkness (such as a bedroom or a hallway) which is small, lightweight, easily portable, and which can be installed and deinstalled at will by nontechnical consumers.

SUMMARY OF THE INVENTION

In accordance with the teachings of this invention, a novel illumination device is provided which is small, inexpensive, and conveniently plugs into a standard power outlet, thereby allowing easy installation and deinstallation by nontechnical consumers, and thereby allowing the security light to be easily moved to any wall outlet as security needs change. In accordance with the teachings of this invention, the illumination device is capable of providing any desired amount of illumination within a specified range, as defined by the size of light bulbs which are readily available on the market. This illumination device includes a motion detector so that the illumination is provided only in the presence of one or more persons who would find the illumination beneficial. Means is provided for causing the lamp to remain illuminated for a desired amount of time after the cessation of movement. A photoelectric device is provided such that the security light is illuminated in response to motion only when there is an insufficient amount of ambient light available from other sources. In one embodiment of this invention, a vision restrictor is provided such that motion is detected only from a desired detection area. In one embodiment, a vision extender is utilized in order to optimize the field of view for the motion detector, making the device more useful in narrow hallways and other unique installations.

BRIEF DESCRIPTION OF THE DRAWINGS

FIGS. 4a-2c depict a vision extender for use with the security light of this invention.

DETAILED DESCRIPTION

One embodiment of a device constructed in accordance with this invention is a motion-activated portable light, such as a nightlight, or security light, which provides a desired amount of relatively low-level illumination automatically when movement is observed by rapid changes in infrared radiation, and turns off shortly after motion ceases. Any suitable size lamp can be used, thereby allowing the user to select the desired amount of illumination.

The device of this invention is conveniently made portable by being small and light-weight so that it can simply be plunged into a wall outlet without the need to be permanently wired. If desired, to secure the device from being dislodged, it can be affixed by utilizing the outlet wall plate screw.

Figure 1:
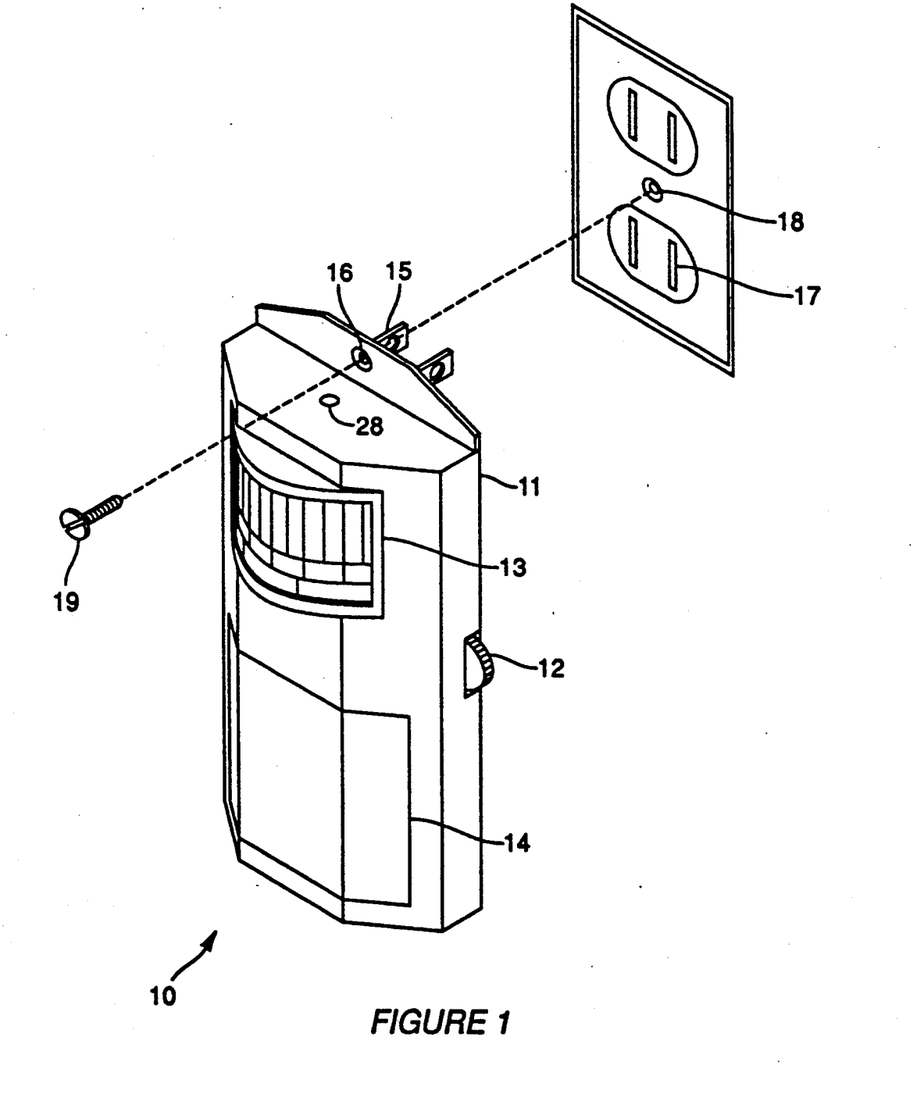
FIG. 1 is an external view of one embodiment of a security light constructed in accordance with the teachings of this invention.

FIG. 1 is an external view of one embodiment of a security light 10 constructed in accordance with the teachings of this invention. Security light 10 is preferably constructed from plastic materials, and is preferably constructed of several pieces of injection molded plastic. Security light 10 includes housing 11 which includes an opening for control knob 12. In one embodiment, as is more fully described later, control knob 12 is attached to a variable resistor which sets the period of time the light stays on after motion is no longer observed, for example with an approximate range of 5 seconds to 15 minutes. This is particularly useful, for causing the lamp to remain lit for a relatively long period of time after motion ceases, for example in the bedroom of a child who is afraid to fall asleep in the darkness.

Security light 10 also includes illumination port 14 which is of a clear or translucent material such that light from a light bulb contained within security light 10 is made available to the area to be illuminated. Alternatively, illumination port 14 is left open so that the light bulb (not shown) is exposed.

Security light 10 also includes sensor lens 13 which allows infrared energy to enter security light 10 in order to allow motion to be detected. A sensor is preferably included which turns off the light in lighted rooms to save energy and extend bulb life. A red LED lamp on the top of the unit indicates when motion is observed, even in daylight, thereby allowing easy verification of functionality. A plastic Vision Restrictor insert is provided to restrict the scope of vision either upward or downward from the unit (for example, upward restriction might be desired in bedroom installations). The device can be placed, for example, in bedrooms, bathrooms, hallways, and stairways—anywhere light is desired when motion is detected to increase safety, while saving energy and eliminating a source of annoyance (e.g. by interfering with sleep) by not remaining on after motion ceases or when the area is illuminated from other means.

Figure 4A:
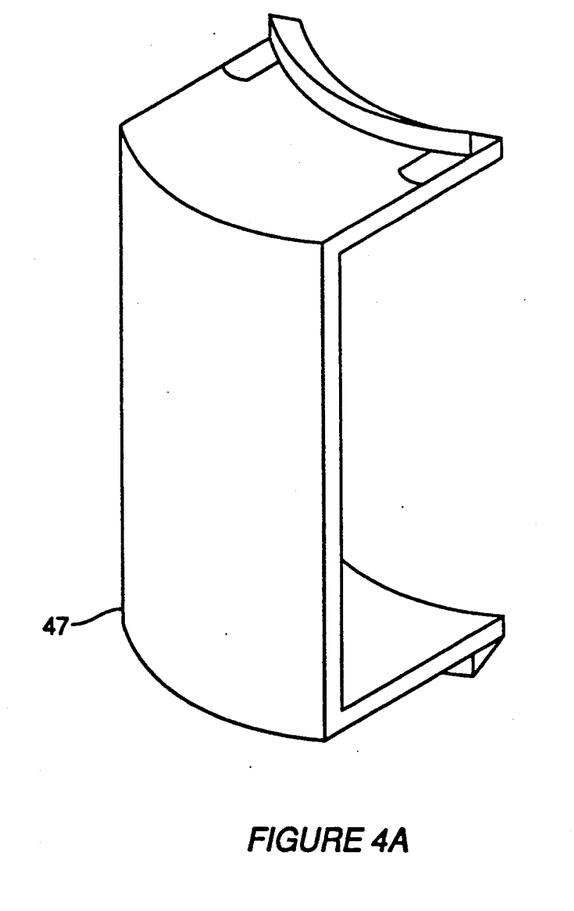
Figure 4B:
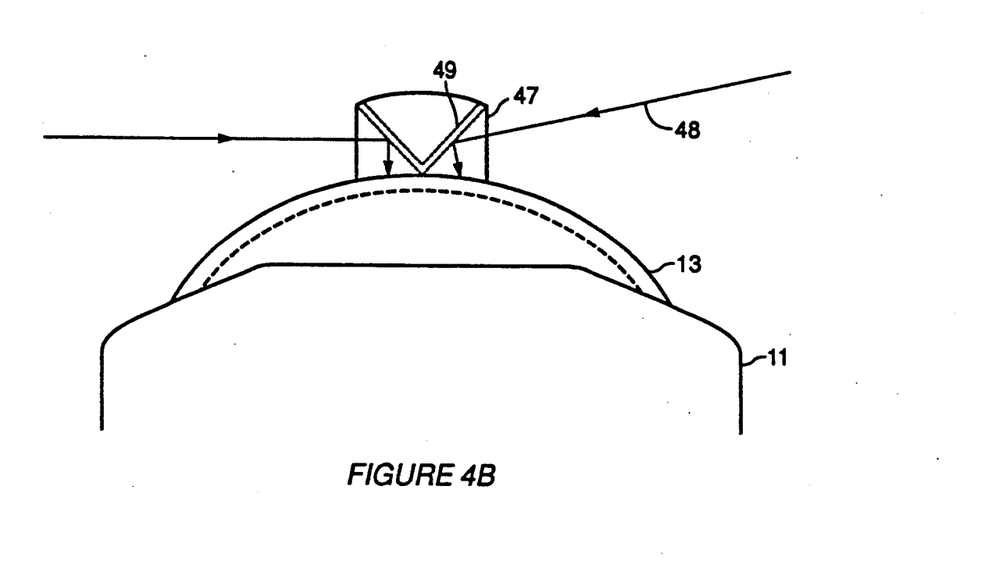
Figure 4C:
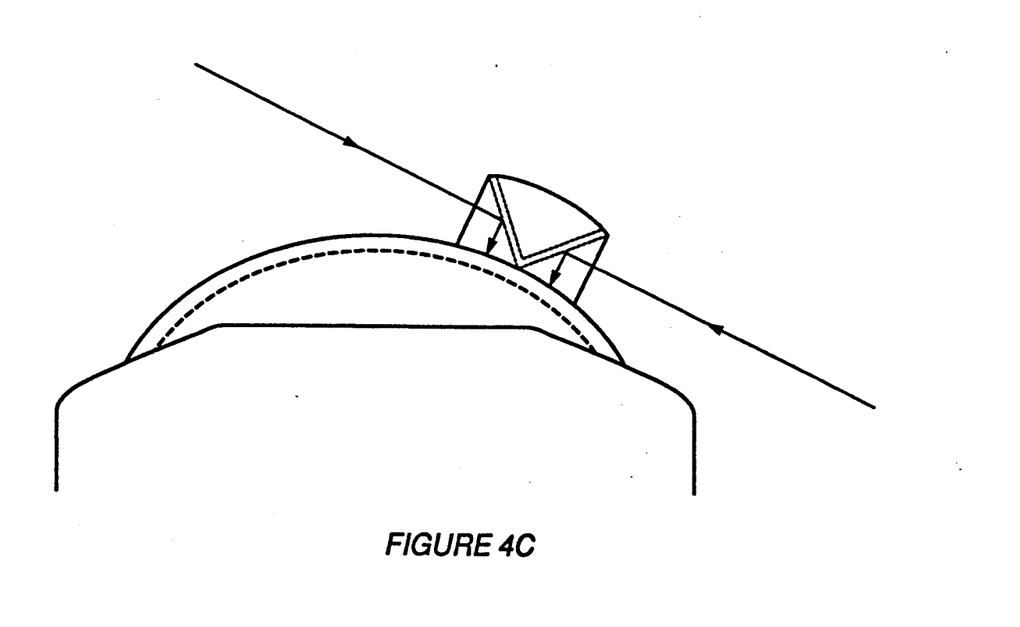

If desired, a vision extender, as shown in FIGS. 4a-4c, can be used to allow a user to select the field of view of the motion detector, for example in order to optimize the field of view for use in narrow hallways and other unique installations. Vision extender 47 is conveniently attached, for example by snapping, to lens 13 of security light 10 (FIG. 1). As shown in FIGS. 4b and 4c, vision extender 47 and lens window 13 are designed in order to allow vision extender to be rotated by the user along the arc of lens 13. In the embodiment shown in FIGS. 4a-4c, lens 13 is a Fresnel lens, and vision extender 47 is constructed of molded plastic with polished metal reflecting surfaces 47. Reflector surfaces 47 are positioned by the user such that incoming rays 48 of infrared energy are reflected to the front of lens 13. The effect is to maximize the unit's view parallel to the wall containing the electrical outlet to which the security light is plugged. By vision extender 47 at different points along the arc of lens 13, optimal viewing (and thus motion detection) for a particular location is achieved, as shown in FIGS. 4b and 4c.

In one embodiment, the security light includes a convenient lamp access door, for example on the back of the security light, in order to allow the user to change the light bulb to a desired wattage bulb, or for replacement of the bulb should it burn out. Preferably, the access door is made of plastic, and snaps in and out of the housing of the security light.

Security light 10 includes plug 15 of a well known design suitable for insertion into standard power outlet 17 in order to power the unit. Thus, security light 10 is easily installed and deinstalled by nontechnical consumers simply by plugging it or unplugging it, respectively, into a standard power outlet. This also allows security lamp 10 to be conveniently relocated to different areas of a building, as desired Security light 10 also includes hole 16 which allows the security light to be more rigidly attached to power outlet 17 via screw 19 which is used to hold the outlet plate in place. While this allows, if desired, security light 10 to be more securely fastened to power outlet 17, this task can be accomplished by unsophisticated consumers and does not require the permanent mounting of the security light to a wall or building structure and does not require permanent electrical wiring changes to wire security light 10 to the power mains, thereby avoiding the need for the consumer to be exposed to safety hazards.

Figure 2:
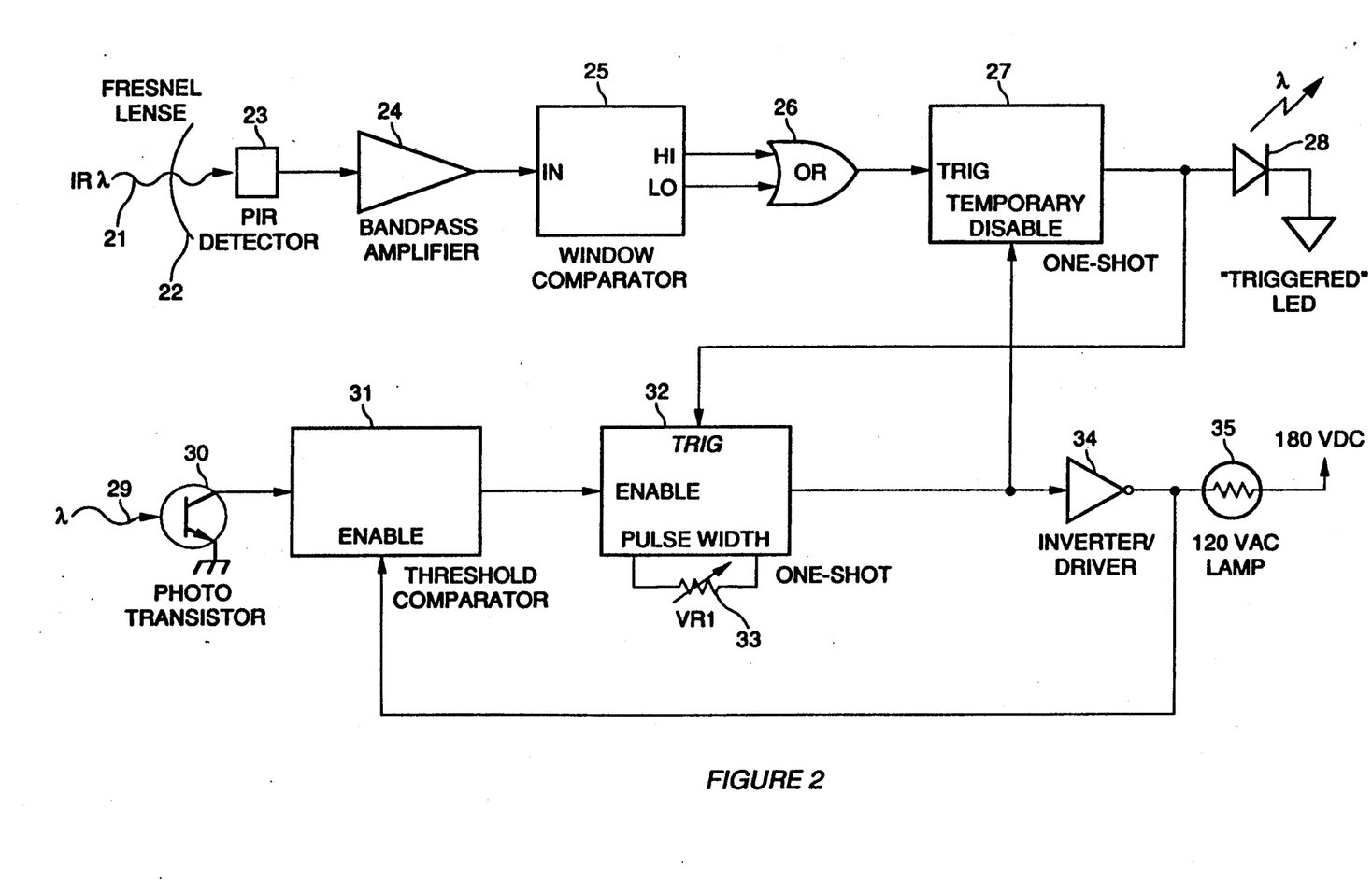
FIG. 2 is a block diagram depicting the circuitry of one embodiment of a security light constructed in accordance with the teachings of this invention.

FIG. 2 is a block diagram depicting one embodiment of a security light constructed in accordance with the teachings of this invention Infrared radiation 21 passes through Fresnel lens 22 and is received by infrared pyrodetector 23. The output signal of detector 23 is applied to the input lead of bandpass amplifier 24, whose output signal is applied to the input lead of window comparator 25. Window comparator 25 provides a high and a low output signal which indicate positive or negative going excursions of the output signal of bandpass amplifier 24, corresponding to changes in the level of infrared radiation detected, indicating movement. These output signals of window comparator 25 are combined via OR gate 26 and applied to the trigger input lead of one-shot 27. The output signal of one-shot 27 illuminates trigger LED 28 and is applied to the trigger input lead of one-shot 32. The output of one-shot 32 is applied to the temporarily disable lead of one-shot 27, in order to inhibit an unwanted trigger pulse which may otherwise be initiated by the change in infrared radiation detected by PIR detector 23 due to lamp 35 turning off. The output of one-shot 32 is also applied to inverter/driver circuit 34 which in turn effectively grounds lamp 35 in order to cause it to be illuminated. The output signal of inverter/driver 34 is also applied to the enable input lead of threshold comparator 31 which provides an output signal to enable input lead of one-shot 32. Threshold comparator 31 serves to enable one-shot 32 only when an insufficient amount of ambient light 29 is detected by phototransistor 30. This prevents lamp 35 from being illuminated when there is sufficient ambient light. Variable resistor 33 serves to set the pulse width of one-shot 32, thereby allowing lamp 35 to remain illuminated for a desired period of time after the cessation of motion, as detected by infrared detector 23.

Figure 3:
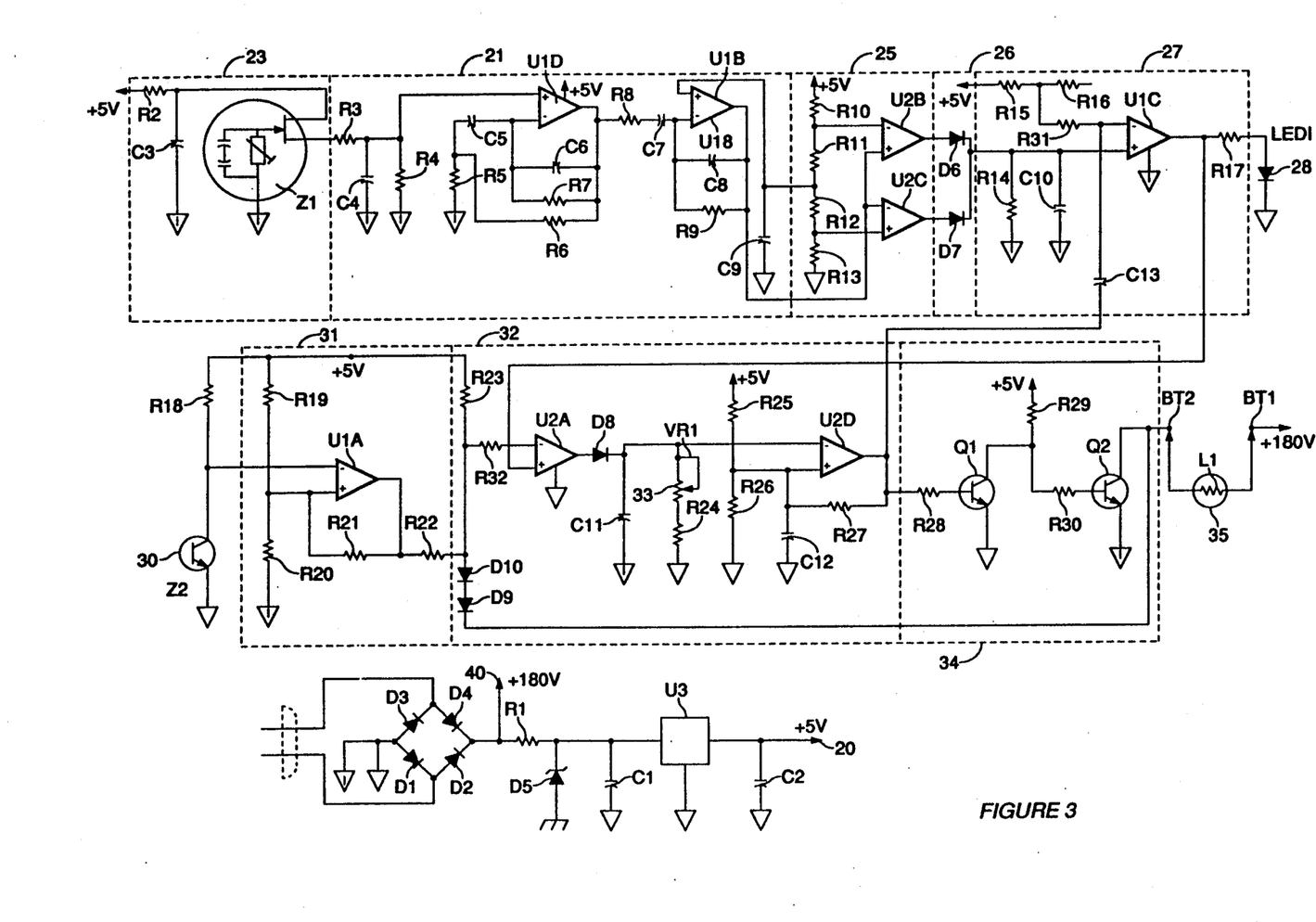
FIG. 3 is a schematic diagram of one embodiment of security light circuitry constructed as shown in the block diagram of FIG. 2.

FIG. 3 is a schematic diagram of one embodiment of a security light constructed in accordance with the embodiment shown in the block diagram of FIG. 2. Dashed boxes are shown in FIG. 3 to illustrate subcircuits corresponding to the blocks contained within the block diagram of FIG. 2, and are thus similarly numbered.

Referring to FIG. 3, the power supply provides regulated 5 VDC as VCC on terminal 30 to power the circuit, and approximately 180 VDC unregulated on terminal 40 which is switched across a standard 115VAC, candelabra-based nightlight lamp L1. The line voltage is rectified by a full wave bridge (D1-D4) and then dropped by resistor R1 and clamped to 9.1 volts by zener diode D5. This voltage is filtered by capacitor C1 and regulated at 5V by regulator U3 to provide the circuit's 5 VDC power on terminal 30.

Infrared PIR sensor Z1 is configured as a source follower. The output of sensor Z1 is processed by a low pass filter formed by resistor R3 and capacitor C4, having a cutoff frequency within the range of approximately 20-40 Hz. A two stage low frequency band pass amplifier 24 is provided by operational amplifiers U1D and U1B, and their associated components. Amplifier 24 passes low frequencies within the range of approximately 0.3 Hz to 5 Hz, which are commonly created by walking past PIR sensor Z1. The output signal of operational amplifier U1B is referenced to a voltage equal to approximately VCC/2. Window comparator circuit 25 formed by voltage comparators U2B and U2C detects positive or negative going excursions of the output signal of operational amplifier U1B.

The thresholds of window comparator 25, and the reference voltage VCC/2 are set by a voltage divider formed of resistors R10, R11, R12, and R13 such that the threshold voltages of voltage comparators U2B and U2C are approximately equal to (VCC/2) $+\Delta V$ and (VCC/2) $-\Delta V$, respectively. In one embodiment, the threshold voltages of voltage comparators U2B and U2C are approximately 2.77 volts and 2.23 volts, respectively. When the output signal from operational amplifier U1B crosses either threshold, the high output signal of the associated one of voltage comparators U2B or U2C is applied via OR gate 26 (formed by wired OR diodes D6 and D7) to one-shot 27. LED delay capacitor C10 charges to a voltage above the threshold set by the voltage divider formed by resistors R15 and R16, causing the output voltage of voltage detector U1C to swing high and illuminate LED1.

The level of this trigger pulse from voltage detector U1C is applied to one-shot 32, as determined by threshold comparator 31. When a moderate amount of light falls on phototransistor Z2, the input voltage applied to the inverting input lead of voltage comparator U1A falls below the threshold voltage of comparator U1A, causing its output voltage to swing high. This provides voltage comparator U2A with a high level threshold voltage which cannot be exceeded by the trigger pulse provided on the output lead of voltage comparator U1C. This effectively inhibits the illumination of lamp L1. Conversely, when phototransistor Z2 is in relative darkness, voltage comparator U1A provides a low threshold voltage to U2A so that the trigger pulse from voltage comparator U1C causes the output voltage of voltage comparator U2A to swing high, charging lamp delay capacitor C11.

When lamp delay capacitor C11 charges to a voltage above that set by the voltage divider formed by resistors R25 and R26 (typically 0.45 volts), the output voltage of voltage comparator U2D swings low. This causes two things to occur. First, transistor Q1 turns off, in turn causing transistor Q2 to saturate and allow current to flow through lamp L1. Second, saturated transistor Q2 causes diodes D9 and D10 to become forward biased, pulling the threshold voltage of voltage comparator U2A low. This prevents the ambient light detector (phototransistor Z2) from interfering when lamp L1 illuminates. When the voltage on capacitor C11 decays to a point below the threshold level of voltage comparator U2D, the output voltage of voltage comparator U2D swings high, forcing (via capacitor C13) the threshold voltage of voltage comparator U1C to a high voltage which will not be exceeded by the voltage provided by voltage comparators U2B and U2C. This has the effect of inhibiting an unwanted trigger pulse from voltage comparator U1C which may otherwise be initiated by the change in infrared radiation detected by PIR sensor Z1 due to lamp L1 turning off. With lamp L1 off and the output voltage of comparator U2D high, capacitor C13 discharges through resistor R31 until the threshold voltage of comparator U1C is low enough to be crossed by the next pulse from window comparator 25. Until this occurs, the unit cannot be retriggered and lamp L1 remains dark.

Figure 5:
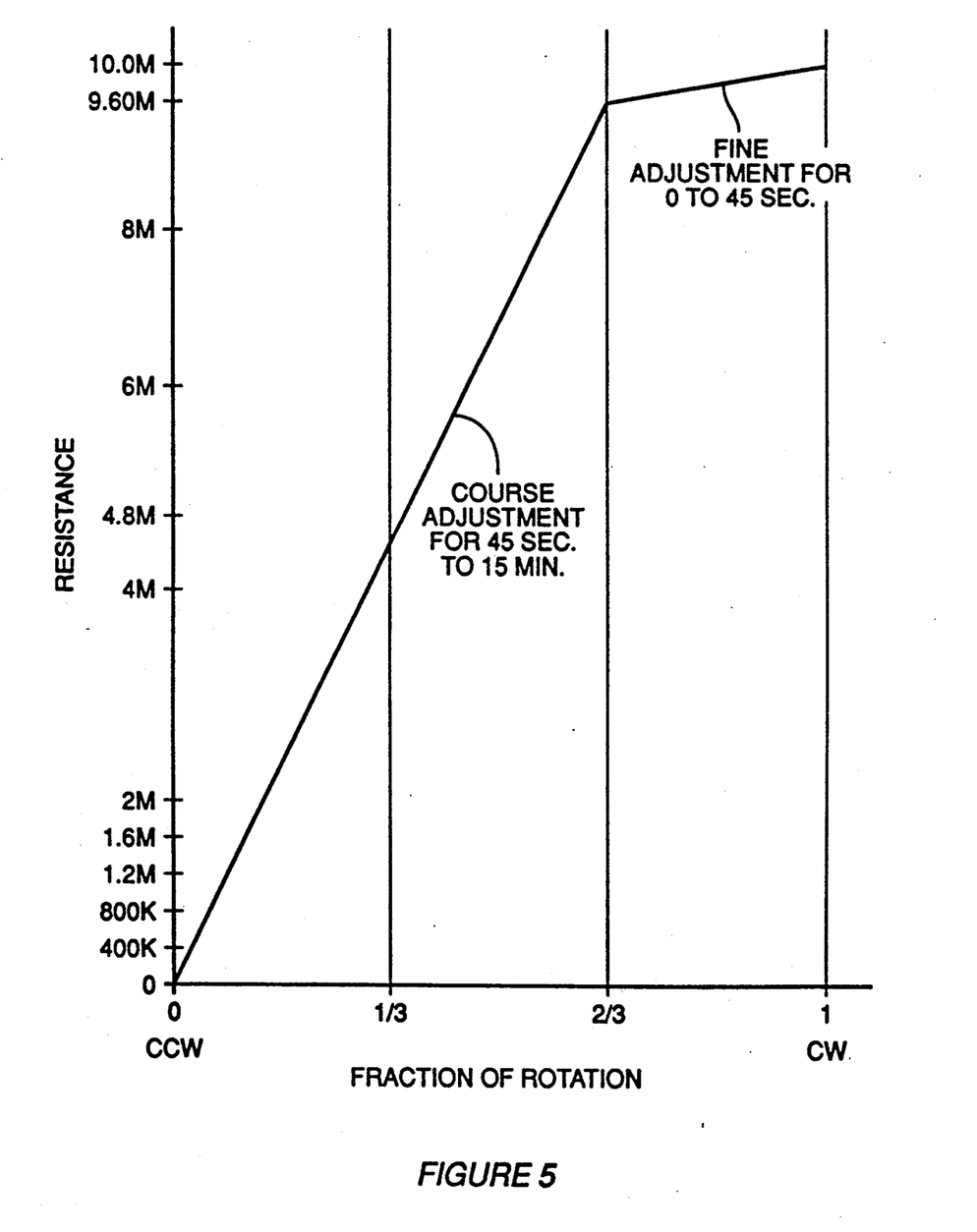
FIG. 5 is a graph of a preferred variable resistor for use in the security light of this invention.

In one embodiment, variable resistor 33 is a dual-slope linear potentiometer having the resistance characteristics depicted in the graph of FIG. 5.

The following parts list is exemplary of the construction of the embodiment of FIG. 3.

| Part No. | PARTS LIST Description |
| --- | --- |
| R1 | 3.9K, 10% |
| R2 | 15K |
| R3 | 100K |
| R4 | 1.1M |
| R5 | 4.7K |
| R6 | 560K |
| R7 | 5.6M |
| R8 | 51K |
| R9 | 1.0M |
| R10 | 39K |
| R11 | 4.7K |
| R12 | 4.7K |
| R13 | 39K |
| R14 | 1.0M |
| R15 | 39K |
| R16 | 51K |
| R17 | 180 |
| R18 | 1.0M |
| R19 | 100K |
| R20 | 100K |
| R21 | 1.1M |
| R22 | 51K |
| R23 | 510K |
| R24 | 39K |
| R25 | 510K |
| R26 | 51K |
| R27 | 3.3M |
| R28 | 6.8K |
| R29 | 680 |
| R30 | 33 |
| R31 | 5.6M |
| R32 | 330K |
| C1 | 100 μF/25 V |
| C2 | 0.1 μF/50 V |
| C3 | 4.7 μF/35 V |
| C4 | 0.1 μF/50 V |
| C5 | 4.7 μF/35 V |
| C6 | 0.1 μF/50 V |
| C7 | 10 μF/25 V |
| C8 | 0.01 μF/50 V |
| C9 | 0.01 μF/50 V |
| C10 | 0.47 μF/63 V |
| C11 | 47 μF/16 V |
| C12 | 0.01 μF/50 V |
| C13 | 0.22 μF/50 V, 5% |
| D1 | 1N4004 |
| D2 | 1N4004 |
| D3 | 1N4004 |
| D4 | 1N4004 |
| D5 | 1N4739 |
| D6 | 1N4148 |
| D7 | 1N4148 |
| D8 | 1N4148 |
| D9 | 1N4148 |
| D10 | 1N4148 |
| LED1 | HLMP-1000 Hewlett Packard |
| Q1 | 2N3904 |
| Q2 | MPSA42 |
| U1 | LM324N |
| U2 | LM324N |
| U3 | AN78L05 |
| VR1 | 10M |
| Z1 | KRX11 Amperex |
| Z2 | L14Q1 General Electric |

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A security light comprising:
   a source of illumination;
   pronged plug means for insertion into a standard electrical wall outlet without the need for permanent electrical connection to power mains or permanent physical attachment to a structural support;

means for detecting motion in an area near said security light; and means for applying power to said source of illumination in response to the detection of said motion.

2. A security light as in claim 1 which further comprises:

means for detecting ambient light; and means for disabling said means for applying power in response to a predetermined amount of ambient light.

3. A security light as in claim 1 wherein said motion detector comprises an infrared motion detector.

4. A security light as in claim 1 which further comprises means for selecting the area near said security light within which motion is to be detected.

5. A security light as in claim 4 wherein said means for selecting comprises a faceplate which selects one of a plurality of areas depending on the orientation of said faceplate with respect to said security light.

6. A security light as in claim 4 wherein said selected area is such that motion by a sleeping person is not detected while motion by others is detected.

7. A security light as in claim 1 which further comprises means for selecting a desired amount of time during which power is applied to said source of illumination, after motion is not longer detected.

8. A security light as in claim 2 which further comprises means for disabling said means for detecting ambient light when power is applied to said source of illumination.

9. A security light as in claim 1 which further comprises means for disabling said means for detecting motion when said means for applying power to said source of illumination causes power to said source of illumination to be switched off.

10. A security light as in claim 1 which further comprises means for adjusting the field of view of said means for detecting motion.

11. A security light as in claim 10 wherein said means for adjusting comprises:

a fresnel lens for receiving infrared radiation and directing said infrared radiation to an infrared detector; and one or more movable reflective surfaces for directing infrared radiation received from a desired direction and reflecting said infrared radiation to said fresnel lens.

* * * * *